UNITED STATES PATENT OFFICE.

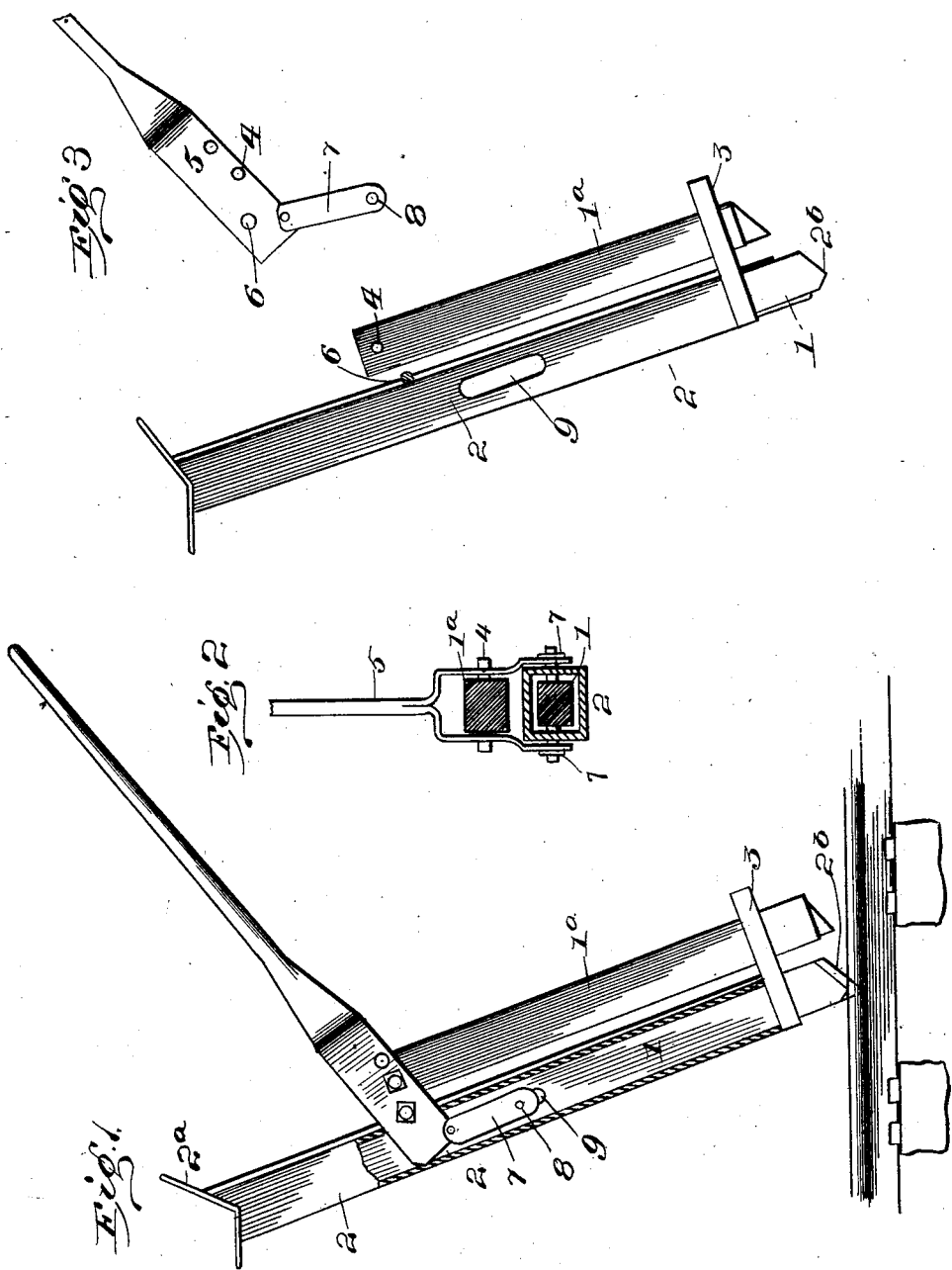

PEDER ROISUM, OF ERSKINE, MINNESOTA.

CAR-MOVER.

SPECIFICATION forming part of Letters Patent No. 672,961, dated April 30, 1901.

Application filed August 24, 1900. Serial No. 27,943. (No model.)

*To all whom it may concern:*

Be it known that I, PEDER ROISUM, a citizen of the United States, residing at Erskine, in the county of Polk and State of Minnesota, have invented certain new and useful Improvements in Car-Movers; and I do hereby declare the following to be a full, clear, and exact description of the invention, such as will enable others skilled in the art to which it appertains to make and use the same.

The invention relates to certain improvements in manual motors or jacks, especially for moving or pushing box or freight cars.

In use the jack is highly effective for moving cars, as above intimated. It is simple, easily and cheaply constructed, and readily operated.

It consists of two alternately-operating "stepping" or pushing bars or dogs toggled or linked together and capable of actuation by a common lever and in the details of construction of the parts, substantially as hereinafter more fully disclosed, and specifically pointed out in the claims.

In the accompanying drawings, Figure 1 is a side view of the preferred embodiment of the invention, parts being in section, with the link of the dog-actuating lever at the near side retained, which, however, in observing the rules governing the making of a sectional drawing should be omitted. Fig. 2 is a cross-section, and Fig. 3 is a view showing the respective parts of the device.

In carrying out the invention I employ two stepping or pushing bars or dogs 1 1$^a$, each having a pointed or edged lower end to aid in giving it a grip or bite upon the rail. The bar or dog 1 is inclosed within a case 2, preferably rectangular, and having an angular head or cross-piece 2$^a$, adapted to engage or receive the edge of the frame or truck of a car that it may be desired to move or push. The lower end of said case 2 has downward lateral extensions 2$^b$ or flanges on each side, which embrace the sides of the rail and prevent lateral displacement. The stepping or pushing bar 1$^a$ is only about half the length of bar 2 and is restricted or limited in its movement at the lower end by a bridle or guide 3, fixed to and near the lower end of said case. The bar or dog 1$^a$ is carried at its upper end by preferably a cross-pin or pivot 4 passed therethrough or by pivots extending laterally therefrom engaging or held in the arms of the bifurcated end of a hand-lever 5, fulcrumed upon the case 1 at 6. The extreme outer or free ends of the arms of the bifurcated portion of the lever 5 are connected or pivoted to the upper ends of the toggle-links 7, whose lower ends are suitably pivoted or connected, as at 8, to the bar or dog 1, said pivotal connection passing through elongated slots 9 in the casing 2.

In applying the motor or jack for use in moving a car the angular cross-piece or head at the upper end of the case of the dog or bar 1 is placed against the edge or frame of the car it may be desired to push or move, and the lower end of said dog or bar is caused to rest upon the rail, with the lateral downward extensions 2$^b$ flanking the rail for the purposes aforesaid.

The lever 5 is suitably grasped and manipulated or given a successively downward and upward stroke, which of course will exert its force upon the dog or bar 1$^a$, whose lower end, following in the wake of that of the holding dog or bar 1, bears upon the rail. This in turn exerts or transmits a pushing action to the aforesaid dog or bar 1, delivering or transmitting its thrust to and thus effectually moving the car, the pivotal connection between the lever 5 and the dog 1 as said lever is moved downward moving through the slots 9 in the casing 2, thus engaging and transmitting movement to said casing, which directly pushes the car. With the next downward movement of the lever the dog or bar 1$^a$ will be again stepped forward, as before, and accordingly impart a successive impulse to the dog 1, and the car thus be moved or impelled forward by the step-by-step action of the dogs or bars 1 and 1$^a$ and the dog-carrying closure or case engaging the car.

Having thus described my invention, what I claim, and desire to secure by Letters Patent, is—

1. In a motor or jack of the character described, the combination of a case or closure, adapted to engage the object to be moved or acted upon, the "stepping" or pushing bars or dogs adapted to engage the rail and linked or toggled together, one of said dogs being carried by said case and having a pivot movable in slots in said case, and means for alternately actuating or imparting a step-by-step motion to said dogs or bars, substantially as set forth.

2. In a manual motor or jack, the combination of a case or closure adapted to engage the car or object to be moved, the stepping bars or dogs, one carried by said case or closure and having a pivot movable in slots in said case, and a hand-lever carrying the other of said dogs or bars, pivoted to said case or closure, and linked to the pivot of the first-referred-to dog or bar, substantially as set forth.

3. In a manual motor or jack, the combination of a case or closure adapted to engage the object acted upon, the stepping or pushing bars, one inclosed by said case and having a pivot movable in slots in said case, a bifurcated hand-lever pivoted to said case, links connected to the pivot of the case-inclosed dog or bar and to arms of the bifurcated portion of said hand-lever, and the other dog or bar pivoted to or carried by said hand-lever, substantially as set forth.

4. In a manual motor, the combination of a case or closure having at its upper end an angular cross-piece or head, and its lower end provided with lateral downward-extending "stepping" or pushing bars or dogs having lower pointed ends to engage the track-rail, one of said dogs or bars being inclosed within said case, and a hand-lever pivoted to said case and having linked thereto said case-inclosed dog or bar and having pivoted or connected directly thereto the other of said dogs or bars, said case or closure also having a fixed guide or bridle near its lower end to restrict or limit the rearward movement of the last-referred-to dog or bar, substantially as set forth.

In testimony whereof I affix my signature in presence of two witnesses.

PEDER ROISUM.

Witnesses:
  A. W. KASSE,
  A. C. BRATTON.